July 11, 1933.                R. GOOD                1,917,247
APPARATUS FOR FEEDING BATCH MIXTURES TO FURNACES
Filed July 1, 1931          2 Sheets-Sheet 1

Inventor
Robert Good
By
Eccleston & Eccleston
Attorneys

July 11, 1933.  R. GOOD  1,917,247
APPARATUS FOR FEEDING BATCH MIXTURES TO FURNACES
Filed July 1, 1931  2 Sheets-Sheet 2
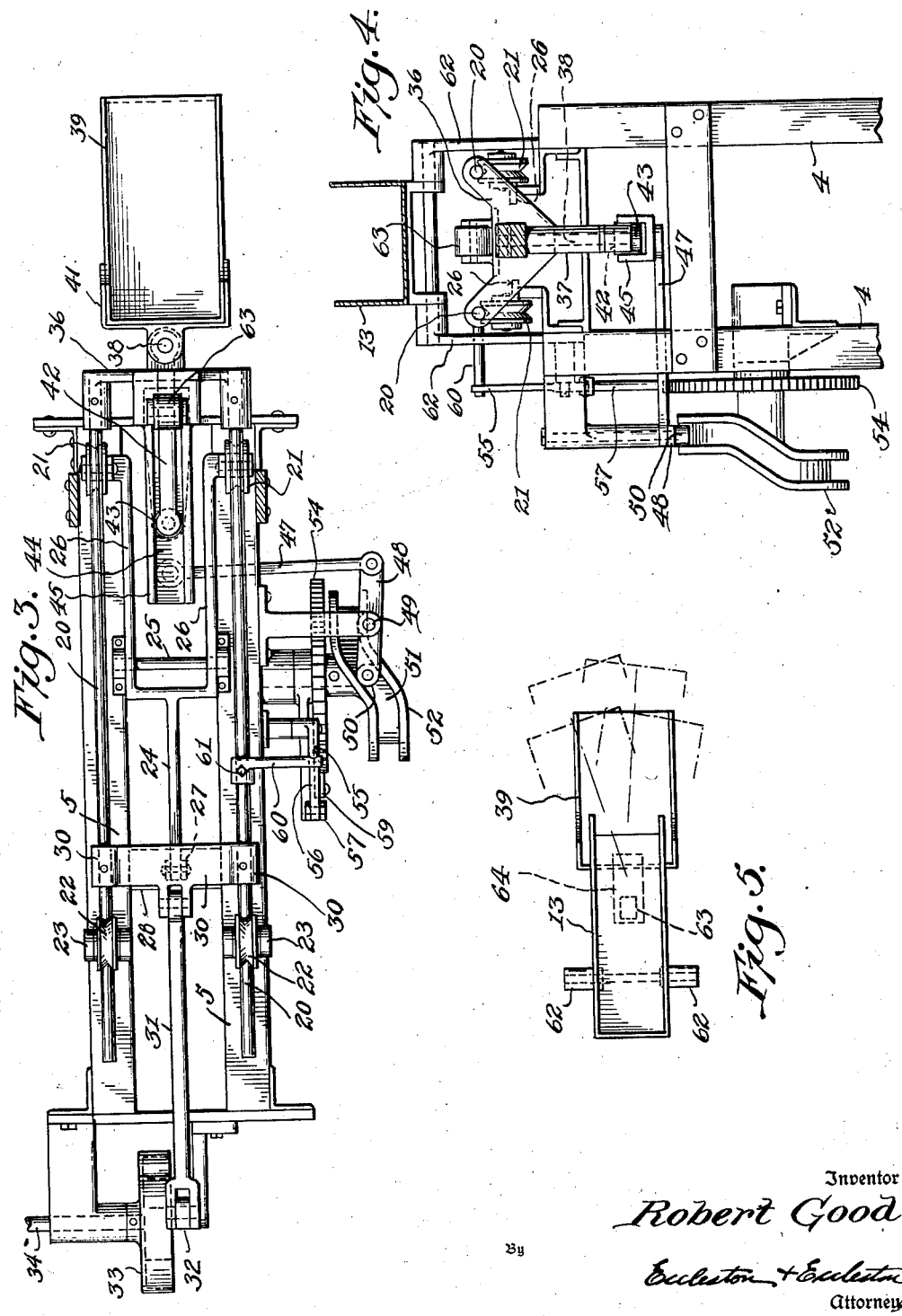
Inventor
Robert Good
By
Eccleston + Eccleston
Attorneys Patented July 11, 1933

1,917,247

UNITED STATES PATENT OFFICE

ROBERT GOOD, OF WASHINGTON, PENNSYLVANIA, ASSIGNOR TO HAZEL-ATLAS GLASS COMPANY, OF WHEELING, WEST VIRGINIA, A CORPORATION OF WEST VIRGINIA

APPARATUS FOR FEEDING BATCH MIXTURES TO FURNACES

Application filed July 1, 1931. Serial No. 548,217.

The invention disclosed herein is an improvement upon the inventions disclosed in my applications Serial No. 269,447 filed April 12, 1928, and Serial No. 460,777 filed June 12, 1930; and the present application is a continuation in part of both of said applications. The first-mentioned application discloses an apparatus and method for spreading the glass batch in a thin even layer over the surface of the glass, and then causing the thin layer to float bodily forward into the furnace, always in the same straight path. In practical use the apparatus and method disclosed in the first-mentioned application has not only effected a very material saving of labor, but also has produced a more effective melting of the batch mixture with a consequent more uniform quality of refined glass. This, in turn, resulting in an increased production of finished articles.

The second-mentioned application constitutes an improvement on the method and apparatus of the first application. The batch was spread in a thin even layer as before, and then caused to float bodily forward into the furnace, as before; but in accordance with the disclosure of the second-mentioned application, each layer of batch was moved into the furnace along a path at an angle to the path of the preceding layer of batch, so that the batch floated into the furnace over a fan-shaped area, as distinguished from the straight-line method of the first application.

The present invention relates to an improvement in the devices of both of the earlier applications, and as will appear hereinafter, it is adapted to use with the devices of both of the earlier applications. While the present invention includes a number of improvements in the inventions of the earlier applications, the main feature relates to a rocking trough for controlling the feed of batch, thereby improving the feed and eliminating the stationary shovel of the said earlier devices.

Numerous objects and advantages of the invention will be apparent to those skilled in the art, from the following detailed description, when taken in connection with the accompanying drawings, in which:

Figure 3 is a plan view of the device, with the hopper and trough removed to more clearly show the construction.

Figure 4 is a front elevational view of the device; parts being in section, and parts being omitted; and Figure 5 is a diagrammatic view, illustrating various positions assumed by the chute.

Figure 1:
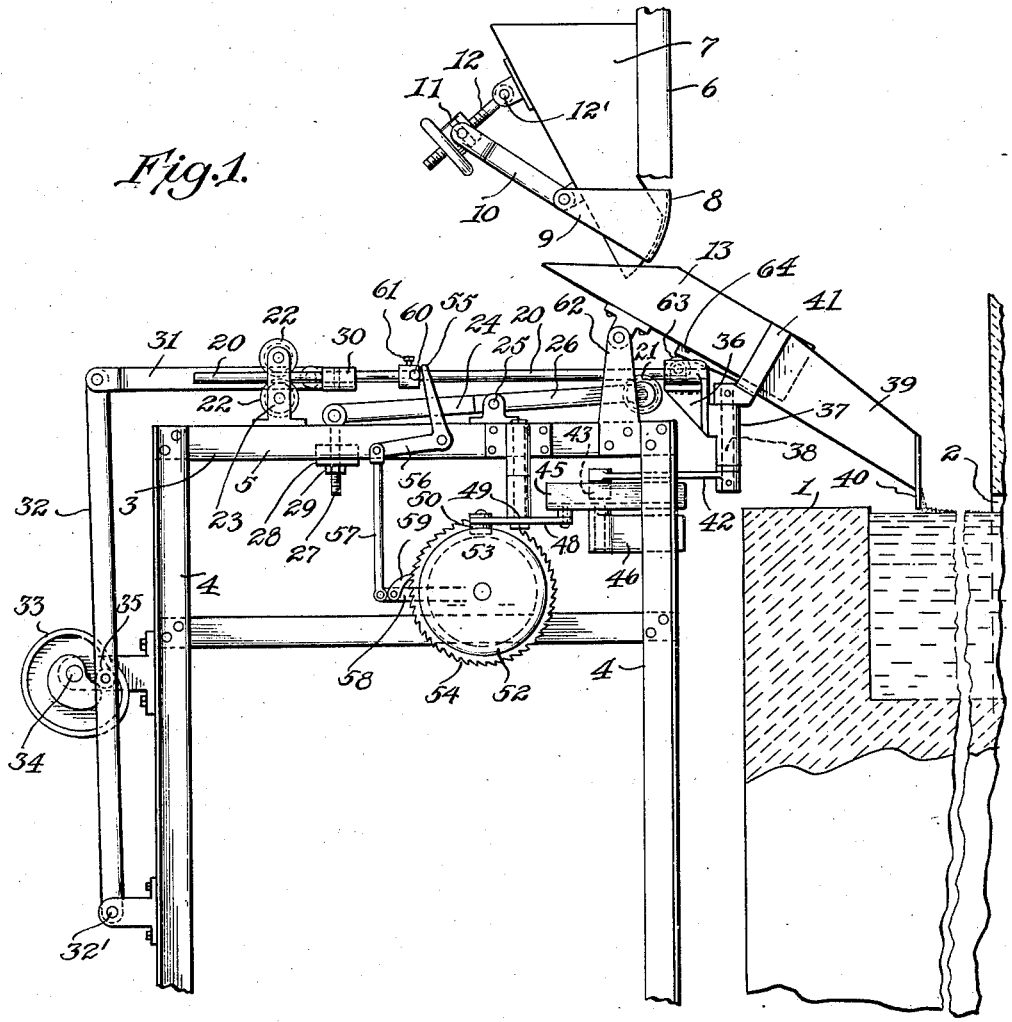
Figure 1 is a side elevational view of the apparatus; the chute being in the course of its rearward travel and approaching the limit of rearward travel.

Referring to the drawings in more detail, numeral 1 designates a portion of the rear end of a glass furnace of the continuous type and generally referred to as a dog house. Such structures usually include an arched aperture through which the charge is admitted to the interior of the melting tank; such aperture being here indicated by the numeral 2.

The frame work of the batch feeder is designated generally by the numeral 3, and is preferably composed of the vertically disposed legs 4 of angle iron or the like, and the horizontal brace bars 5. The legs or uprights 4 adjacent to the dog house, are provided with vertical extensions 6 which form a support for a hopper 7, which receives the batch through its upper end, from a batch bin (not shown), or from any other source.

The lower end of the hopper 7 is provided with a closure or gate pivoted by means of its arms 9 to the rear wall of the hopper or other fixed support on the frame. Operatively associated with the pivot of the gate 8 is an arm 10 which has its opposite end pivotally connected with a swivel nut 11 mounted on the screw 12. This screw is pivotally connected at 12' to the rear wall of the hopper 7, thereby allowing a swinging movement of the screw as the nut 11 is adjusted lengthwise thereof. It will be apparent that by means of this construction the gate 8 may be readily moved to closed position, or adjusted to various open positions, thus regulating the quantity of material passing through the hopper per unit of time.

Pivotally mounted below the hopper 7 is a trough 13. In the apparatus disclosed in my first application, Ser. No. 269,447, a downwardly inclined chute is fixed to the front end of the trough. The chute was downwardly inclined but rigid with the trough, and trough and chute moved back and forth in a fixed path, spreading the mixture in a thin even layer as it moved backwardly, and causing the layer to float bodily into the furnace on its forward movement. A stationary, but adjustable, shovel arranged in the trough acted to force the batch from the trough during its rearward movement. In the apparatus disclosed in my second application, Serial No. 460,777, the trough and the shovel remained substantially the same, and the downwardly inclined chute, while it still moved back and forth with the trough, yet it was also movable laterally so that the batch was spread over a somewhat fan-shaped area. In accordance with the present invention, the shovel is eliminated and the trough no longer moves back and forth with the chute, but is stationary except for a rocking movement in a vertical plane. I have illustrated this trough with the laterally movable chute of my application Ser. No. 460,777, but it will be understood that the invention includes the use of the improved trough with the chute of my application Ser. No. 269,447, which is movable only back and forth in a fixed path. The construction and operation of the trough 13 of the present application will be described after the apparatus for operating the chute has been described.

Numeral 20 refers to two substantially horizontal parallel rods which are guided at their front and rear ends by means of rollers or sheave wheels 21 and 22 respectively. The wheels 22 are mounted in bearings 23, and it will be noted that two of these wheels are provided for each rod 20, one above and one below the same, to restrict the rods to a substantially horizontal plane. Numeral 24 refers to a lever which is fulcrumed at 25, and which has its forward portion forked to provide arms 26, 26. The rollers 21 are journaled in the forward ends of these fork arms. Pivotally attached to the rear end of the lever 24 is a threaded link 27 which passes freely through a plate 28, and has threaded on its lower end a nut 29. It is apparent that by the adjustment of this nut the fork arms 26 and rollers 21 carried thereby, may be raised or lowered. By this means the chute, to be presently described, may be adjusted to bring the pusher bar carried thereby to position where it will skim over the surface and cause the batch to float bodily forward into the tank. Thus the chute or pusher bar may be adjusted to take care of any slight variation in the level of the glass in the tank.

The mechanism for reciprocating the rods 20 will now be described. Numeral 30 indicates a crosshead secured to the rods 20, and the forward end of a link 31 is pivotally attached to the crosshead. The rear end of this link is pivotally attached to the upper end of a lever 32; the lower end of the lever being pivotally mounted on the frame 3, as indicated by numeral 32'. A closed cam, indicated by numeral 33, is secured to a shaft 34, and this shaft is constantly rotated by any desired means, such as by a variable speed motor and associated gearing, as illustrated in my aforesaid earlier applications. A roller 35 carried by the lever 32, rides in the closed cam path of cam 33 and the continuous rotation of the cam thus oscillates the lever 32, thereby moving the rods 20 back and forth; the preferred movement being a slow forward stroke and a quick return stroke, the cam being designed to give the proper strokes.

Secured to the forward ends of the rods 20 is a bracket 36, and this bracket is provided with a bearing 37 for a pin 38 which projects above and below the bearing. Numeral 39 refers to the chute, which is downwardly inclined, and which is provided at its lower end with a pusher bar 40. A bracket 41 provides a mounting for the chute, and this bracket is secured to the upper end of the pin 38.

It is thus apparent that as the rods 20 are moved back and forth, the chute will likewise move back and forth. This straight-line movement of the chute is sufficient, but I prefer that the chute be also given a lateral step-by-step movement, as described in my application Ser. No. 460,777. The preferred mechanism for imparting this lateral step-by-step movement to the chute, will now be described.

Secured to the lower end of the pin 38 is an arm 42, and the free end of this arm is provided with a roller 43 which rides in a groove 44 of a guide 45. This guide is pivotally mounted on a bracket 46 fixed to the frame 3. Pivotally attached to the bottom of the guide 45, adjacent its rear end, is a link 47, and the opposite end of the link is pivotally connected with a lever 48; the lever being fulcrumed at 49.

The rearwardly extending arm of the lever 48 is provided with a roller 50 which rides in the cam groove 51 of the cam 52. The contour of the cam groove is such, that as the cam rotates it will move the lever 48 step-by-step to one side and then to the other side. Of course, the number of steps to the right and left of the central position may be varied in different installations, by employing different cam contours. The movement imparted to the lever 48 causes the arms 42 to turn through a certain angle, thereby turning the chute through the same angle. The apparatus for giving a step-by-step movement to the cam 52 will now be described.

This cam is keyed or otherwise secured to a shaft 53, suitably mounted on the frame of the machine; and secured to the same shaft is a ratchet wheel 54. A bell-crank lever, having an upwardly extending arm 55 and a downwardly extending arm 56 is mounted on the frame of the machine adjacent one of the rods 20. A link 57 is pivotally attached at its upper end to the lower arm 56 of the bell-crank lever, and the lower end of the link 57 is pivotally attached to the end of a link 58 which has its opposite end loosely mounted on the shaft 53 of the ratchet wheel and cam.

A pawl 59 is mounted on the link 58, and engages the teeth of the ratchet wheel. When the upper arm 55 of the bell-crank lever is moved to the right (Fig. 1) the linkage and the pawl will be lifted thereby rotating the ratchet and the cam one step. Of course the pawl will ride freely over the teeth of the ratchet wheel when the linkage is lowered. The downward movement of the linkage and pawl is stopped by the engagement of the arm 56 of the bell-crank lever with a stop pin (not shown) or by any other desired device. It is desired to rotate the cam one step each time the chute reciprocates, so that the chute will follow a different path in each reciprocation. Various means may be employed for this purpose, but I preferably employ a laterally projecting finger 60 secured to one of the rods 20, and of such length that it will engage the upper arm 55 of the bell-crank lever, when the finger is carried forward by the movement of the rod 20. The finger is preferably secured to the rod 20 by a set-screw 61, so that it is adjustable along the rod. The position of the trip finger determines the point at which the chute starts its laterally swinging movement. This swinging movement is preferably, though not necessarily, imparted to the chute just as the chute is approaching the end of its forward movement.

The means for controlling the flow of batch from the trough 13 to the chute 39 will now be described.

Figure 2:
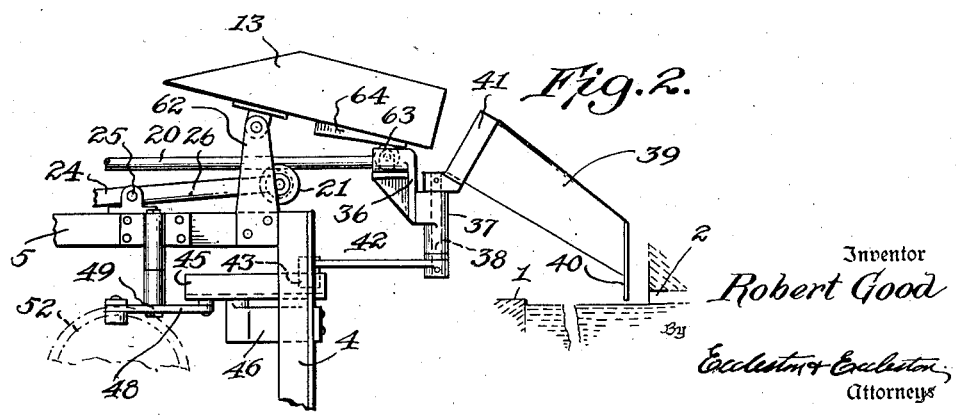
Figure 2 is a fragmentary view similar to that of Figure 1, but showing the chute at the limit of its forward movement.

As shown in Figures 1 and 2, the trough is pivotally mounted adjacent its rear end upon brackets 62 fixed to the main frame. The trough is rocked up and down about this pivot, but obviously cannot be moved back and forth as disclosed in my aforesaid earlier applications. When the trough is rocked upwardly the flow of batch from the trough to the chute will stop, although the batch continues to flow from the hopper to the trough; and when the trough is lowered the flow of batch to the chute will be resumed.

Various means may be employed for rocking the trough, and of course the invention is not limited to any particular means, though I preferably employ the means illustrated. Mounted on the bracket 36, is a roller 63, upon which rests the forward portion of the trough 13. The bottom of the trough could rest directly on this roller, but I preferably provide the bottom of the trough with a rail 64 which tapers from the rear to the front end; and this rail rests upon the roller 63. In accordance with this construction, as the chute moves forward the roller 63 riding under the rail 64, will swing the trough upwardly beyond the angle of slip, thereby stopping the flow of batch from the trough to the chute, and as the chute starts its rearward stroke the trough will be lowered sufficiently to cause a resumption of the flow of batch from the chute.

Let it be assumed that the chute 39 is at the forward limit of its stroke, and that the gate 8 of the hopper 7 is open to the proper extent, thereby permitting a constant flow of the batch, in the desired volume, from the hopper to the trough 13. With the parts thus positioned there is no flow of batch from the trough to the chute, for the reason that when the chute is in its forward position the trough has been rocked upwardly beyond the angle of slip.

The continuous rotation of the cam 33 draws the chute to the rear, and as the rearward movement starts, the roller 63 traveling under the rail 64 permits the trough to rock downwardly, thereby initiating the flow of batch from the trough to the chute. The batch thus supplied to the chute flows therefrom to the surface of the molten glass, upon which it is spread in a thin even layer during the continued rearward travel of the chute.

When the chute reaches its rearward limit of travel, the continued rotation of the cam immediately starts the chute on its slow forward movement. As the forward stroke of the chute starts, the roller 63 rocks the trough upwardly beyond the angle of slip, thereby stopping the flow of batch from the trough to the chute; and the pusher bar 40 causes the layer of batch, which was spread by the rearward movement of the chute, to float bodily into the furnace, much like a cake of thin mushy floating ice.

As the chute approaches the forward limit of its stroke, the operation of the bell-crank lever by the finger 61, causes the cam 52 to rotate one step, thereby swinging the chute laterally through a certain angle. This completes one cycle of operation, and the parts are now ready to repeat the cycle; the only difference being that in each cycle the chute will travel over a different path, so that the batch is spread over a fan-like area. It will be apparent that when the present invention is used with the apparatus disclosed in my application Ser. No. 269,447, the chute will not be given the lateral step-by-step movement, but will travel in a fixed straight path.

The present invention is subject to many changes and modifications, all of which I aim to include within the scope of the appended claims.

What I claim is:

1. A batch feeder for glass furnaces, including means for spreading the batch in a thin layer, and means operated by the first-mentioned means to control the feed of batch.

2. A batch feeder for glass furnaces, including means for spreading a layer of batch, and means operated by the first-mentioned means to start the feeding of batch.

3. A batch feeder for glass furnaces, including means for spreading the batch, and means operated by the first-mentioned means to stop the feeding of batch.

4. A batch feeder for glass furnaces, including a chute movable back and forth, said chute during its rearward movement spreading a layer of batch; and means operated by the chute for starting the feeding of batch.

5. A batch feeder for glass furnaces, including a chute movable back and forth, said chute in its forward movement causing a layer of batch to float bodily forward, and means operated by the chute for stopping the feeding of batch.

6. A batch feeder for glass furnaces, including a chute movable back and forth, a trough associated with the chute and movable up and down, the up and down movement of the trough being controlled by the back and forth movement of the chute.

7. A batch feeder for glass furnaces, including a chute movable back and forth to spread layers of batch, a trough vertically oscillatable to control the feeding of batch, and means for periodically oscillating the trough.

8. A batch feeder for glass furnaces, including a chute movable back and forth to spread layers of batch, a trough vertically oscillatable to control the feeding of batch, and means for periodically oscillating the trough, said means being operated by the back and forth movement of the chute.

9. A batch feeder for glass furnaces, including a chute movable in a horizontal plane, and a trough movable in a vertical plane, the latter supplying batch to the former.

10. A batch feeder for glass furnaces, including a chute movable in a horizontal plane, and a trough movable in a vertical plane, the movement of the latter being controlled by the movement of the former.

11. A batch feeder for glass furnaces, including means movable over the glass for spreading a layer of batch thereon, a vertically oscillatable member controlling the feed of batch to said means, and means for oscillating said member in timed relation with the movements of the first-mentioned means.

12. A batch feeder for glass furnaces, including means movable over the glass for spreading a layer of batch thereon, a trough pivotally mounted and adapted to feed batch to said means, and means movable with the first-mentioned means for tilting the trough about its pivot.

13. A batch feeder for glass furnaces, including means movable over the glass for spreading a layer of batch thereon, a trough pivotally mounted and adapted to feed batch to said means, a roller upon which said trough rests, and means for moving the roller back and forth to swing the trough up and down about its pivot.

14. A batch feeder for glass furnaces, including a chute reciprocable over the glass for spreading a layer of batch thereon, means for reciprocating the chute, a roller reciprocable with the chute, a pivotally mounted trough, the forward portion of the trough supported by said roller.

15. A batch feeder for glass furnaces, including a chute reciprocable over the glass for spreading a layer of batch thereon, means for reciprocating the chute, a roller reciprocable with the chute, a pivotally mounted trough, and a tapering rail provided on the underside of the trough, the rail resting on said roller.

16. A batch feeder for glass furnaces, including a chute for spreading a layer of batch, means for reciprocating the chute, means for swinging the chute laterally step-by-step, a vertically oscillatable trough for controlling the feed of batch to the chute, and means for oscillating the trough.

17. A batch feeder for glass furnaces, including a chute for spreading a layer of batch, means for reciprocating the chute, means for swinging the chute laterally step-by-step, a vertically oscillatable trough for controlling the feed of batch to the chute, and means controlled by the movement of the chute for oscillating the trough.

18. A batch feeder for glass furnaces, including a chute, a trough supplying batch to the chute, means for reciprocating the chute, means for swinging the chute laterally, and means for moving the trough up and down.

19. A batch feeder for glass furnaces, including a chute movable over the glass, a pusher bar carried by the chute, means for reciprocating the chute in a horizontal plane, means for vertically adjusting the chute, means for swinging the chute laterally step-by-step, a pivotally mounted trough; a roller movable with the chute and supporting one end of said trough, a hopper arranged above the trough for supplying batch thereto, and means for regulating the volume of batch flowing from the hopper.

ROBERT GOOD.